United States Patent
Geboers

(10) Patent No.: US 11,099,038 B2
(45) Date of Patent: *Aug. 24, 2021

(54) DATA LOGGER AND SAMPLING AND ENCODING METHODS FOR USE IN A DATA LOGGER

(71) Applicant: Missio B.V., Valkenswaard (NL)

(72) Inventor: Josephus Joannes Antonius Geboers, Valkenswaard (NL)

(73) Assignee: Missio B.V., Valkenswaard (NL)

( * ) Notice: Subject to any disclaimer, the term of this patent is extended or adjusted under 35 U.S.C. 154(b) by 225 days.

This patent is subject to a terminal disclaimer.

(21) Appl. No.: 15/888,181

(22) Filed: Feb. 5, 2018

(65) Prior Publication Data

US 2018/0156645 A1 Jun. 7, 2018

Related U.S. Application Data

(63) Continuation-in-part of application No. PCT/EP2015/077905, filed on Nov. 27, 2015.

(30) Foreign Application Priority Data

Aug. 3, 2015 (EP) .................................... 15179510

(51) Int. Cl.
*G01D 9/00* (2006.01)
*G01K 1/022* (2021.01)
(Continued)

(52) U.S. Cl.
CPC ............. *G01D 9/005* (2013.01); *G01K 1/022* (2013.01); *G06F 11/3013* (2013.01);
(Continued)

(58) Field of Classification Search
CPC . G01D 9/005; G06F 11/3476; G06F 11/3058; G06F 11/3013; G01K 1/022; G01K 2207/04
See application file for complete search history.

(56) References Cited

U.S. PATENT DOCUMENTS

| 8,696,198 B2 | 4/2014 | Huang et al. |
| 2007/0267509 A1* | 11/2007 | Witty ..................... G01D 9/005 236/51 |

(Continued)

FOREIGN PATENT DOCUMENTS

| CA | 2698078 A1 | 9/2011 | |
| JP | 02015017858 * | 7/2013 | ............. G01C 21/16 |

(Continued)

*Primary Examiner* — Alexander Satanovsky
(74) *Attorney, Agent, or Firm* — Richard M Goldberg

(57) ABSTRACT

A data logger (1) for logging values of a physical environment parameter (T) as a function of time (t) includes a sampling subsystem (2), which acquires sample values (21) of the physical environment parameter (T) at sampling moments which are separated by sample intervals, an encoding subsystem (3) which defines data records representing groups of one sample value (21) or a number of successive sample values (21) with variations which meet a first stability criterion, each data record including first identifiable bits (b10-b00) defining a representative value (Trep) for the samples values (21) of the corresponding group and second identifiable bits (b15-b12) indicating the number of samples in the corresponding group and a flag bit (b11) indicating the use of either the first or second interval length, and a memory subsystem (4) for storing the sequence of defined data records into a memory (7).

5 Claims, 6 Drawing Sheets

(51) Int. Cl.
*G06F 11/30* (2006.01)
*G06F 11/34* (2006.01)

(52) U.S. Cl.
CPC ...... *G06F 11/3058* (2013.01); *G06F 11/3476* (2013.01); *G01K 2207/04* (2013.01)

(56) References Cited

U.S. PATENT DOCUMENTS

| | | | | |
|---|---|---|---|---|
| 2009/0119466 A1* | 5/2009 | Gower | ............... | G06F 11/3419 711/154 |
| 2011/0218770 A1* | 9/2011 | Ii | ............... | G06F 11/34 702/182 |
| 2014/0174174 A1* | 6/2014 | Uehara | ............... | A61B 5/227 73/379.01 |
| 2015/0273737 A1* | 10/2015 | Chen | ............... | B29C 41/22 428/336 |
| 2016/0175603 A1* | 6/2016 | Sheldon | ............... | A61B 5/6869 607/4 |

FOREIGN PATENT DOCUMENTS

| WO | 01/51836 A1 | 7/2001 |
|---|---|---|
| WO | 2004/036327 A1 | 4/2004 |

* cited by examiner

DATA LOGGER AND SAMPLING AND ENCODING METHODS FOR USE IN A DATA LOGGER

FIELD OF THE INVENTION

The invention relates to a data logger for logging values of a physical environment parameter, in particular an ambient temperature, as a function of time. The invention also relates to a method for sampling and encoding a physical environment parameter for use in the data logger. The invention further relates to an encoding method for use in the data logger. The invention further relates to a reading device for reading the logged data from the data logger and a method for making software for the reading device available for downloading. Finally the invention relates to a decoding method for decoding data records created by means of the encoding method.

BACKGROUND OF THE INVENTION

U.S. Pat. No. 8,696,198 B2 discloses a temperature recorder whereby ambient temperatures are stored in an electronic memory.

Although these devices can be very helpful, a major disadvantage is that the available memory is used inefficiently when, for cost saving reasons, the memory size must be small. This is true in particular, for low cost temperature loggers that are used for monitoring the storage conditions of temperature sensitive medication or food or any other temperature sensitive product over a very long time. For such applications it is crucial that efficient use is made of the available storage space in order to limit the costs. In particular for medications, the time between production and use can be very long. In the case of medication storage periods of several years are no exception.

SUMMARY OF THE INVENTION

It is an object of the invention to provide a data logger and methods for sampling and encoding which requires less storage capacity for the logged data.

According to a first aspect of the invention this object is achieved by a data logger for logging values of a physical environment parameter as a function of time, which data logger comprises, a sampling subsystem for acquiring sample values of the physical environment parameter at sampling moments which are separated by sample intervals, an encoding subsystem for defining data records representing groups of one sample value or a number of successive sample values with variations which meet a first stability criterion, whereby each data record comprises first identifiable bits defining a representative value for the samples values of the corresponding group and second identifiable bits defining the number of samples in the corresponding group, a memory subsystem for storing a sequence of defined data records into a memory, wherein a length of the sample interval is settable to a first length or to a second length which is smaller than the first length, and wherein the encoding subsystem is further arranged to include at least one flag bit in the data record indicating the length of the sample interval for the samples represented by the data record.

According to a second aspect of the invention this object is achieved by a method for sampling and encoding a physical environment parameter as a function of time, in which method sample values of the physical environment parameter are acquired at sampling moments which are separated by sample intervals, defining data records representing groups of one sample value or a number of successive sample values with variations which meet a first stability criterion, whereby each data record comprises first identifiable bits defining a representative value for the sample values of the corresponding group and second identifiable bits indicating the number of samples in the corresponding group, wherein a length of the sampling interval is settable to a first length and to a second length which is smaller than the first length, wherein at least one flag bit is included in the data record indicating the length of the sample interval for the samples represented by the data record.

According to a third aspect of the invention this object is achieved by a method of encoding a series of successive sample values of a physical environment parameter which are sampled at sample moments separated by sample intervals, in which method groups including one sample or more samples of successive samples having sample values with variations which meet a first stability criterion are converted into a sequence of digital data records, whereby each data record comprises first identifiable bits defining a representative value for the samples values of the corresponding group and second identifiable bits indicating the number of samples in the corresponding group, wherein a length of the sampling interval is settable to a first length and to a second length which is smaller than the first length, wherein at least one flag bit is included in the data record indicating the length of the sample interval for the samples represented by the data record.

The invention enables that in cases wherein the behaviour of the environment is such that a more accurate monitoring is desired this can be realized by setting the sample interval to a smaller value. In certain exceptional storage ranges of the environment parameter the negative effect of the environment on the quality is substantially larger than in the usual storage range. In the event of transgression of the boundary of a range with extreme values the time interval can be made shorter to make the monitoring more accurate.

Further in periods wherein the environment parameter is less stable, the environment parameter can vary fast. A sample time interval which is suitable for the periods with a normal stability does not suffice anymore because of the risk that extreme values of the environment parameter are missed. By detecting the less stable periods and shortening the sample interval when such period is detected it is achieved that the chance of missing extreme values is substantially decreased.

This is in particular advantageous for logging environment parameters for medication and food. In general, medication and food stores are climate controlled so that the ambient temperature is relatively stable. Under stable conditions it is not necessary to store the actual temperature value each time a sample is made unless the temperature measured differs significantly from the previous value. In unstable periods or in case of extreme values of the parameter sufficient accurate monitoring is achieved, giving a good insight into the extent to which the quality of the monitored product is negatively affected. A further embodiment of the data logger is arranged to store in a date and time that the monitor process is started in a memory of the data logger.

Based on the stored time and date the sample date and times can be calculated. According to a fourth aspect of the invention a reading device for reading the data records from the memory of the data logger comprises a decoder for reconverting the data records into the sample values of the sampled physical environment parameter by creating on the basis of the data records sequences of M samples with a sample value equal to the representative value defined by the first identifiable bits of the records, with M the number indicated by the second identifiable bits of the data records.

An embodiment of the reading device comprises a display subsystem for displaying a function on a screen of the display subsystem, which function is created on the basis of the reconverted sample values and indicates the sample values of the logged environment parameter.

With this embodiment the results of the data logging can be made visible to the user in a very comfortable way.

A further embodiment of the reading device comprises a program controlled processor and a program having command codes, which cause the reconverting and or creation of the function when the command codes are executed by the program controlled processor.

The use of the program controlled processor makes it possible to add the reader functionality to a programmable device that is already available for other functions, such as for example a Smartphone provided with an interface which is connectable to the data logger. A suitable way of coupling the reading device to a Smartphone makes use of NFC-technology, whereby both the data logger and the Smartphone are NFC-enabled.

The use has further the benefit that the reading device can be easily updated by updating the software.

It is beneficial to make the software for the reading device available for downloading on a server which can be coupled to the reading device via a communication network, such as the internet.

According to a fifth aspect of the invention in a method of decoding digital data records created by the encoding method, sequences of M samples are created, which samples have a sample value equal to the representative value defined by the first identifiable bits of the records, with M the number indicated by the second identifiable bits of the data records.

BRIEF DESCRIPTION OF THE DRAWINGS

These and other aspects and advantages of the invention will be apparent from and elucidated further with reference to the embodiments described by way of example in the following description and with reference to the accompanying drawings, in which.

DETAILED DESCRIPTION OF EMBODIMENTS

The invention relates to a data logger for logging values of a physical environment parameter as a function of time.

Examples of such physical environment parameter can be an ambient temperature, humidity, light intensity, noise etc. Although the data logger is suitable for logging different physical environment parameters the invention will be explained referring to a data logger for logging the ambient temperature of a product, in particular the ambient temperature of a medication. Many medications are temperature sensitive, which means that the effectivity of the medication is reduced if the medication is stored in an environment in which the temperature is not kept within a certain temperature range. In order to monitor the quality of the medication it is important to know whether the medication is not exposed too long to temperatures outside a prescribed temperature range. Logging the ambient temperature during the storage period is a very helpful tool to monitor the quality of the medication. There is a need for low cost data loggers which can be packaged together with the medication, for example by attaching a small sized data logger to a syringe with medication.

Figure 1:
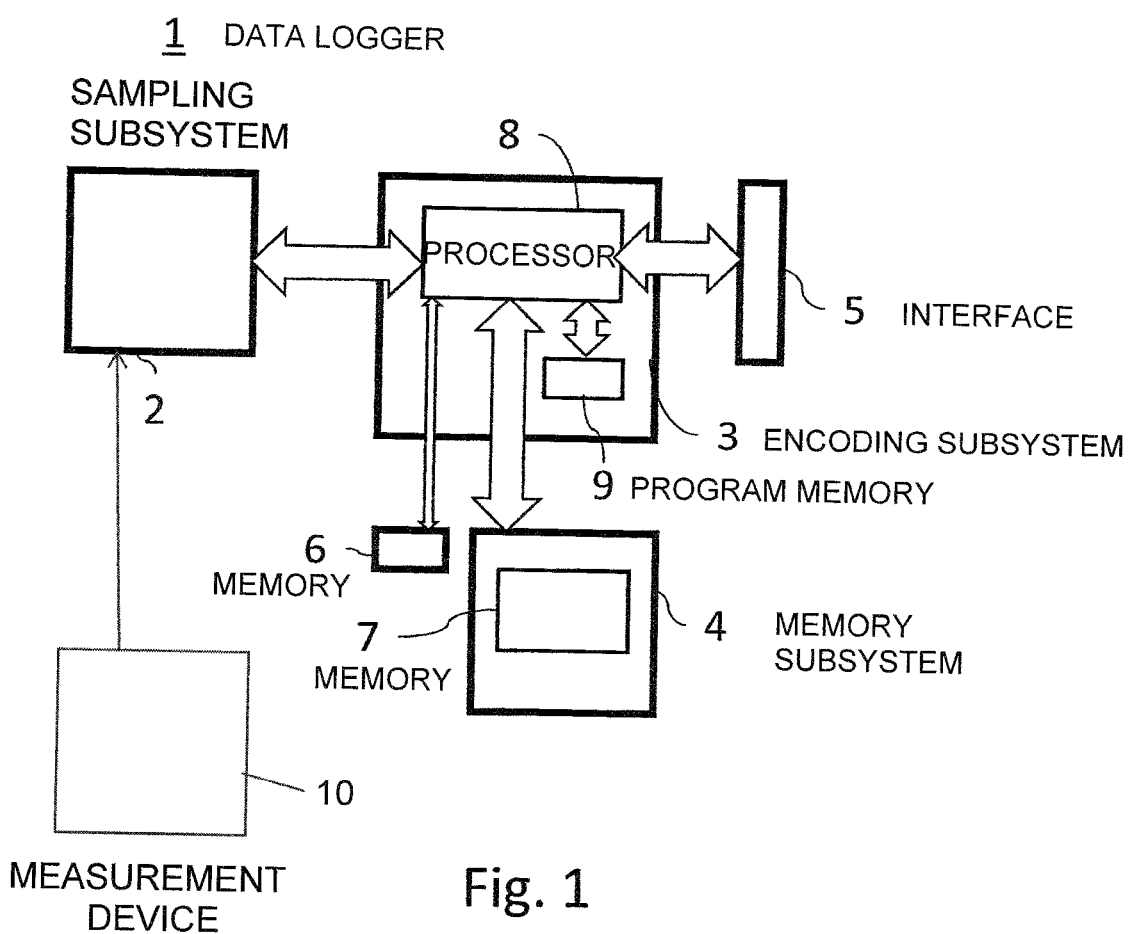
FIG. 1 shows schematically an embodiment of a data logger 1 according to the invention.

FIG. 1 shows schematically an embodiment of a data logger 1 according to the invention. The data logger comprises a measurement device 1 which provides measurement of, for example, ambient temperature, and a sampling subsystem 2 for acquiring sample values $T_n$ of an ambient temperature at successive sampling moments $t_n$ which are separated by sample intervals.

The sampling subsystem is coupled to an encoding subsystem 3 which converts the successive sample values into data records which are stored by a memory subsystem 4 in a memory 7 of the memory subsystem 4. The data logger 1 can further be provided with an interface 5 which enables the read out of the data records by means of a reading device. The interface can be of any type enabling the read out, but is preferably of at type which uses a wireless connection between the reading device and the interface 5. A very suitable interface is an NFC interface, which makes use of the so-called Near Field Communication-technology.

The encoding subsystem 3 is preferably implemented as a program controlled processor 8 which encodes the sequence of sample values under control of firmware stored in a program memory 9 of the encoding subsystem 3. However it will be clear for the skilled person that the encoding subsystem can also be implemented as a hard-wired encoding subsystem.

An encoding method performed by the encoding subsystem under control of the firmware stored in the program memory 9 will be explained with reference to FIGS. 2 and 3.

Figure 2:
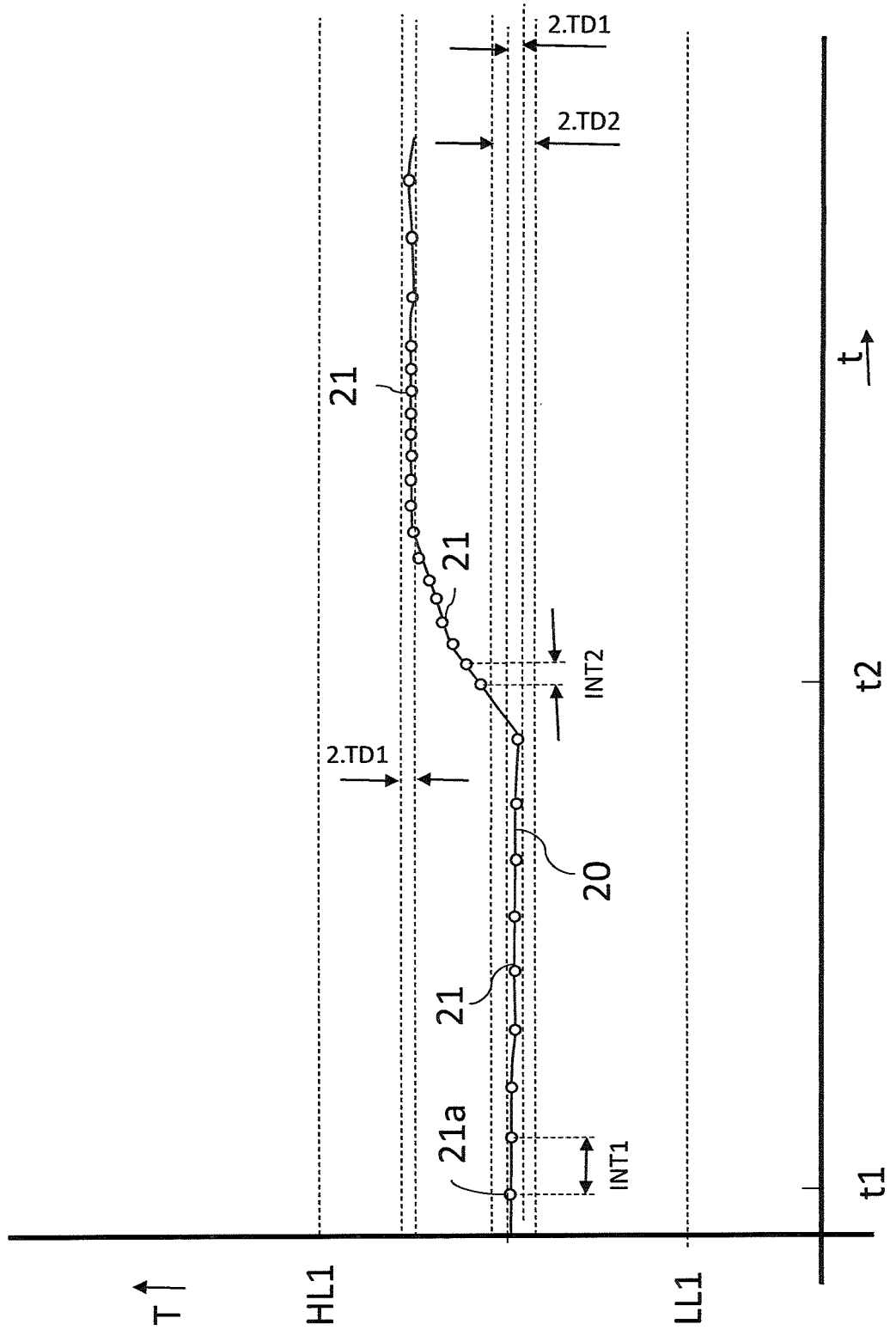
FIG. 2 shows the ambient temperature T as function of a time t and sample values of the samples acquired by the data logger.

FIG. 2 shows the ambient temperature T, indicated by a line 20, as function of a time t. Sample values of the samples acquired by the sampling subsystem 2 are indicated by the dots 21 on line 20. For clarity reasons only a few dots are indicated by reference numbers 21. The sampling is started at t1. The first sample taken is indicated by reference sign 21a. The length of the sample intervals at the beginning of the sampling is set to a value INT1. A suitable value for INT1 is 20 minutes.

For each sample it is detected whether the variation of the sample meets a first stability criterion. This indicates that the temperature T stays stable. A preferred, very accurate, detection method is to check whether the difference between a sample value $t_n$ and the sample value $T_{ref}$ belonging to the latest stored data record stays within a stability range Tr, determined by an upper limit and a lower limit around the value $T_{ref}$. When this occurs, the counter belonging to this latest stored data record is incremented by 1. In case the range lies symmetric around the $T_{ref}$ the first stability criterion is met in case the samples values $T_n$ stays between $T_{ref}$-TD1 and $T_{ref}$+TD1. A suitable value for TD1 is 0.5° C.

It will be clear for the skilled person that several other methods are suitable to determine whether the temperature T stays stable. Another possible stability criterion is a detection whether the sample value $T_n$ at sample moment $t_n$ is within a stability range Tr, determined by an upper limit and a lower limit around the value $T_{n-1}$ of the previous sample so that it is also not required to determine the stability of the ambient temperature on the basis of samples values. Stability of the temperature T can also be determined by means of a dedicated sensor which measures the change of temperature as function of the time.

As long as the first stability criterion is met, a counter is increased with an increment each time a new sample is acquired until the counter reaches a predetermined end count Cend. Then a new data record is defined and stored by the memory subsystem 4. A suitable counter is a 4 bits counter and suitable value for the end count Cend is "16". However counters with another counting range and another end count can be used.

Figure 3:
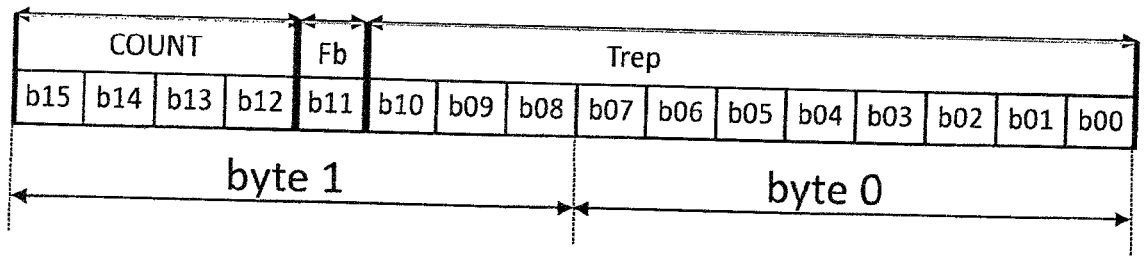
FIG. 3 shows an example of suitable format for the data records.

A suitable format for the data record defined when the predetermined count is reached is shown in FIG. 3.

The format comprises a 16-bit word consisting of 2 bytes (byte 0 and byte 1). 4 bits (b12 to b15) are reserved for storing the count of the counter. This count represents the number of samples of the group of successive samples taken since the start of the counting. 11 bits (b00-b10) are reserved for storing a representative value Trep, for the sample values of the samples belonging to this group. In this embodiment this is the value of the latest sample of the group. However other representative values are suitable, for example the value of another sample of the group, or a value which is the average of all samples of the group. As long as the ambient temperature stays stable in this way data records representing the value of 16 successive samples are defined and stored. However as soon as it is determined that the temperature is not stable any more (as is the case at t2), by detection that new sample value is outside the range Tr, a new data record is defined and stored. The value of the latest sample determines the representative value Trep. This value is stored in the bits b00-b10 of the new data record. The bits b12-b15 are loaded with the count of the counter, which indicates the number of successive samples since the previous data record has been defined. Then the counter is reset to its initial value Cin. So each time the stability information indicates that the temperature is not stable a new data record is defined and stored.

Note that in the above embodiment each data record can represent a group of 16 successive stable sample values at the most. It will be clear for the person skilled in the art that the maximum can be set to any value but limited by the counting range of the counter.

It may happen that the temperature changes fast. In such situations it is useful to have a shorter sample interval so that more details about the behaviour of the temperature are stored.

In order to make the data logging measuring interval time dependent on the speed of the temperature variation, it is detected whether the sample value $T_n$ is within a second stability range Tr2 around the value $T_{n-1}$ of the previous sample. In case the stability range lies symmetric around the sample value $T_{n-1}$ the second stability criterion is met, in case the samples values $T_n$ stays between $T_{n-1}$-TD2 and $T_{n-1}$+TD2, whereby TD2 is greater than TD1. A suitable value for TD2 is 2° C.

In response to such detection the length of the sample interval is set to INT2 which is in most cases smaller than INT1 i.e. samples will be taken more frequently. In this embodiment the value of INT2 is chosen equal to 2 minutes as an example.

If the temperature stabilises again, so that the variation between successive samples is less than ±0.5° C. (TD1), then the counter will reach again its end value Cend after which a new 2 byte data record will be defined and stored and moreover the sampling interval registration is set back to INT1.

It is also possible to keep the INT2 interval measuring time active while the registrations of the temperature values are in accordance with the INT1 timing, i.e. sample measurements are done more frequently but the storage of the values are according INT1 criteria if the INT2 criteria are not met.

If two different sample intervals are used, then for the reconstruction of the logged temperature behaviour it is required to know which data records are based on samples acquired with sample interval INT1 and which data records are based on samples which are acquired with sample interval INT2.

In this embodiment this is solved means of a flag Fb in the data record. In the format of FIG. 3 bit b11 is reserved for the flag Fb. The flag Fb is set to the binary value "0" for samples based on samples with sample interval INT1 and set to binary value "1" for samples bases on samples with sample interval INT2.

In this embodiment only two different sample intervals are used. However embodiments wherein more than two different sample time intervals are possible, in that case more than one flag bit has to be included in the data records.

In the above described embodiment the detection range Tr, used for the determination whether the temperature is considered to be stable, is located symmetrically around the value of the previous sample value $T_{n-1}$.

It is in some cases beneficial to locate this stability range asymmetrical around the previous sample value $T_{n-1}$, when the temperature value is outside a range between HL1 and LL1 (See FIG. 2). Within the temperature range between HL1 and LL1 the stability range Tr is symmetrically around $T_{n-1}$ (in this embodiment to ±0.5° C.). The stability range can be set automatically to a tighter value when the temperature is substantial above the required storage temperatures, indicated by HL1 in FIG. 2. When the higher temperature HL1 is reached, the stability range is changed to +0.125° C. and −0.5° C. around the previous sample value $T_{n-1}$. Also in case the temperature T is substantial below the required storage temperature, indicated by LL1 in FIG. 2 the stability range Tr is also made more tight. When the lower temperature LL1 is reached the stability range Tr is changed to −0.125° C. and +0.5° C. around the previous sample value $T_{n-1}$. This will increase the accuracy for the specified temperature ranges i.e. biological medications the storage conditions are mostly specified between +2.0° C. and +8.0° C.

The values for HL1 and LL1 are stored in the data logger, for example in the firmware. It will be clear that more ranges can be defined by storing more temperature values.

A further embodiment of the data logger is arranged to store in a memory the date and time that the monitor process is started. The benefits of this solution is that only one time and date value must be stored and all other sample times and dates can be calculated based on this start time and date stored in the memory. This memory for storing the time and date can be a part of the memory used for storing the data packets.

Alternatively data logger 1 can be provided with a separate memory 6 for storing this information. In case memory 6 is a write once memory this information cannot be changed anymore after it is written into the memory, so that the time and date information is stored in a very secure and reliable way.

In the embodiment described with reference to FIG. 1 and FIG. 2 the subsystems are indicated as separate parts. However it will be clear for the skilled person that the subsystems can use partly or completely the same components of the data logger, which will usually be the case when a software controlled processor is used. In that case the subsystems make use of the same processor which is controlled with different programs for the different subsystems, which programs are stored in the same program memory. Hereinafter an algorithm which is performed by an embodiment of the program stored in the program memory 9 of the datalogger 1 is described.

The algorithm groups a number(n) of successive temperature samples ($m_n$) as long as the measured value does not differ from the first sample ($m_1$) by more than a defined value (delta). The first measurement $m_1$ is stored in memory 7. After each successive measurement (up to 15), the measured value is compared with the first sample $m_1$. If the deviation is less than the pre-defined allowed deviation (delta) then the actual measurement value is discarded, and this measurement is added to the group. If the deviation is more than the pre-defined allowed deviation (delta) then the actual measurement value is stored and forms the base measurement ($m_1$) of the following group. The following parameters are used in the algorithm:

n=measurement number (1, 2, . . . 15)
$m_n$=$n^{th}$ measurement sample ($m_1$, $m_2$, . . . $m_{15}$)
delta 1=pre-defined allowed deviation in a first range R1 (i.e. LL1<m<HL1)
delta 2=pre-defined allowed deviation in a second range R2 (i.e. m>HL1 or m<LL1)
HL1=high level limit 1
LL1=low level limit 1
HL2=high level limit 2
LL2=low level limit 2
The rules of the algorithm are as follows:
If $|m_n-m_1|$≤delta 1
And LL1<$m_n$<HL1
Then $m_n$:=$m_1$ i.e. measurement is stored as $m_1$
If $|m_n-m_1|$>delta 1
And LL1<$m_n$<HL1
Then $m_n$ is stored as the new measured value and serves as the base measurement value ($m_1$) for the following group of measurements.
If $|m_n-m_1|$≤delta1
And $m_n$>HL1 or $m_n$<LL1 i.e. the measurement is outside the pre-defined first range R1
Then the delta is ignored and $m_n$ is stored as the new measured value and serves as the base measurement value ($m_1$) for the following group of measurements. The delta that is predefined for the second range R2 is then applicable.
If the temperature later returns to the first range R1 in a temperature step that is more than the lowest of the delta values (delta 1 or delta 2), then the grouping restarts and the delta for the first range R1 applies again as defined above. However, if the temperature later returns to the first range R1 in a temperature step that is less than the lowest of the delta values (delta 1 or delta 2), then the measurement is stored as the base measurement value ($m_1$) of the current group.

The delta parameter determines the grouping of the samples. The higher the delta value the more events that can be grouped and as such the more temperatures that can be stored. When the temperature is outside the range R1 HL1/LL1 but within the HL2/LL2 range (second range R2) the delta that is pre-defined for the second range R2 will determine how the measurements are grouped.

Figure 5:
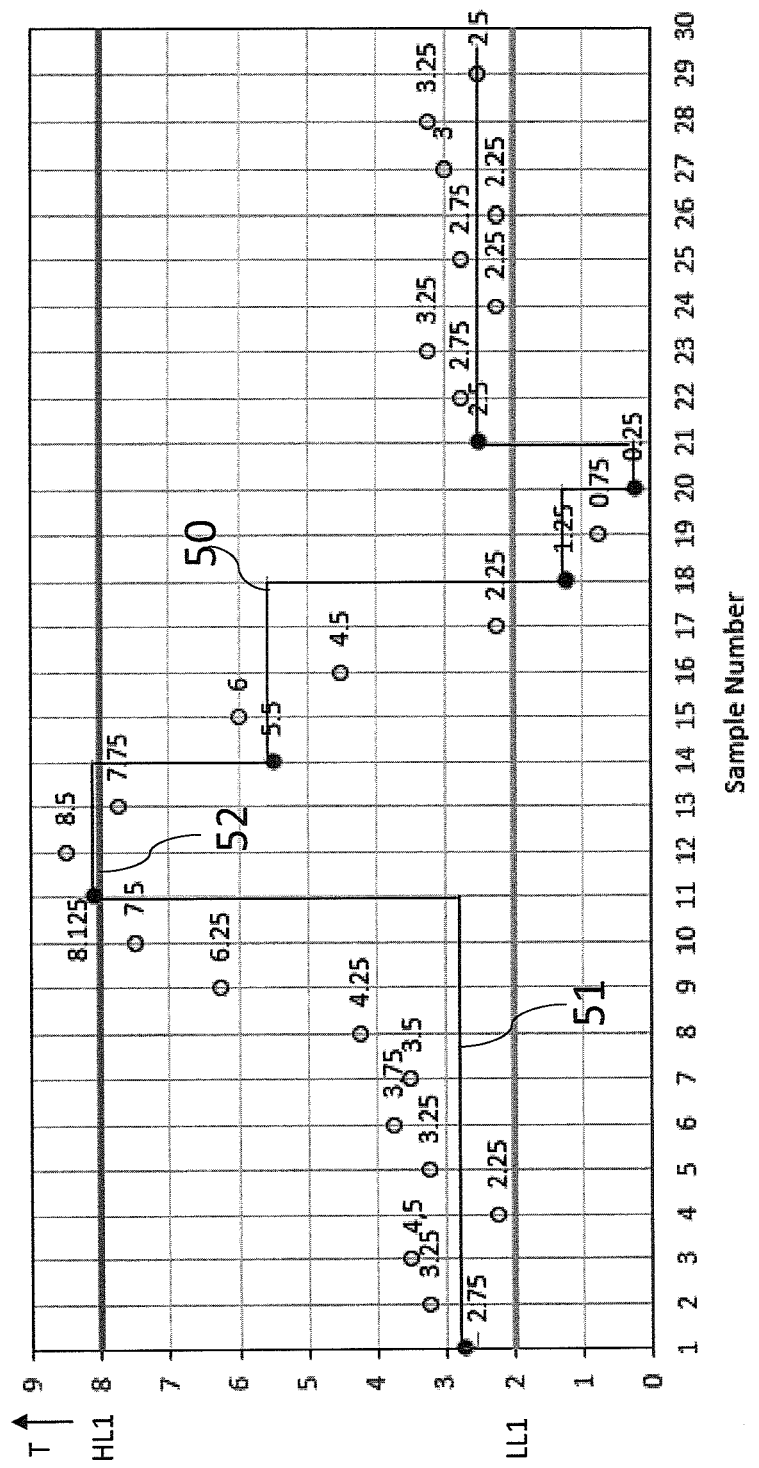
FIG. 5 shows a sequence of samples of the ambient temperature T.

FIG. 5 shows an example of a temperature behaviour which is sampled and processed according to the above described algorithm.

In FIG. 5 the first range R1 is defined as +2° C. to +8° C. (which means LL1 is set to +2° C. and HL1 is set to +8° C.). In this example, the delta 1 is set to 6° C. which is the highest possible variation of the temperature within range R1. However, when the limits LL1 or HL1 are exceeded, the delta value (delta 1) of the first range R1 is ignored. A measurement 8.125° C., which is 0.125° C. outside the limits of HL1/LL1 will be stored as a new base measurement value ($m_1$) for the following group of measurements. In this example, the delta 2 has been set to 1° C. In FIG. 5 the sample values are shown close to the samples and the samples which are stored and used as the base for a new group are shown as dark dots and the samples which are not stored but added to a group are shown as light dots. The group of samples with the values 2.75, 3.25, 4.5, 2.25, 3.25, 3.75, 3.5, 4.25, 6.25 and 7.5 are stored as a single data record representing a group of ten successive samples, all having sample value 2.75. This is indicated in FIG. 5 with line segment 51 of line 50. The group of samples with the values 8.125, 8.5 and 7.75 are stored as a single data record representing a group of three successive samples, all having sample value 8.125. This is indicated in FIG. 5 with line segment 52 of line 50. In this way the sequence of 30 samples shown in FIG. 5 is stored as a sequence of six data records.

In an embodiment of the datalogger three different alarms states can be generated: an alarm state AS1 when the total period t1 that a high level ALH is exceeded is longer than a first predetermined value $t_{ALH}$, an alarm state AS2 when the total period t2 that the temperature is below a low level ALL is longer than a second predetermined $t_{ALL}$ and an alarm state AS3 when the period t3 that the temperature is outside the range R1 at the high side (above HL1) is longer than a third predetermined level $t_{HL1}$.

If desired the alarm levels and times can be freely programmed by the user

Figure 6:
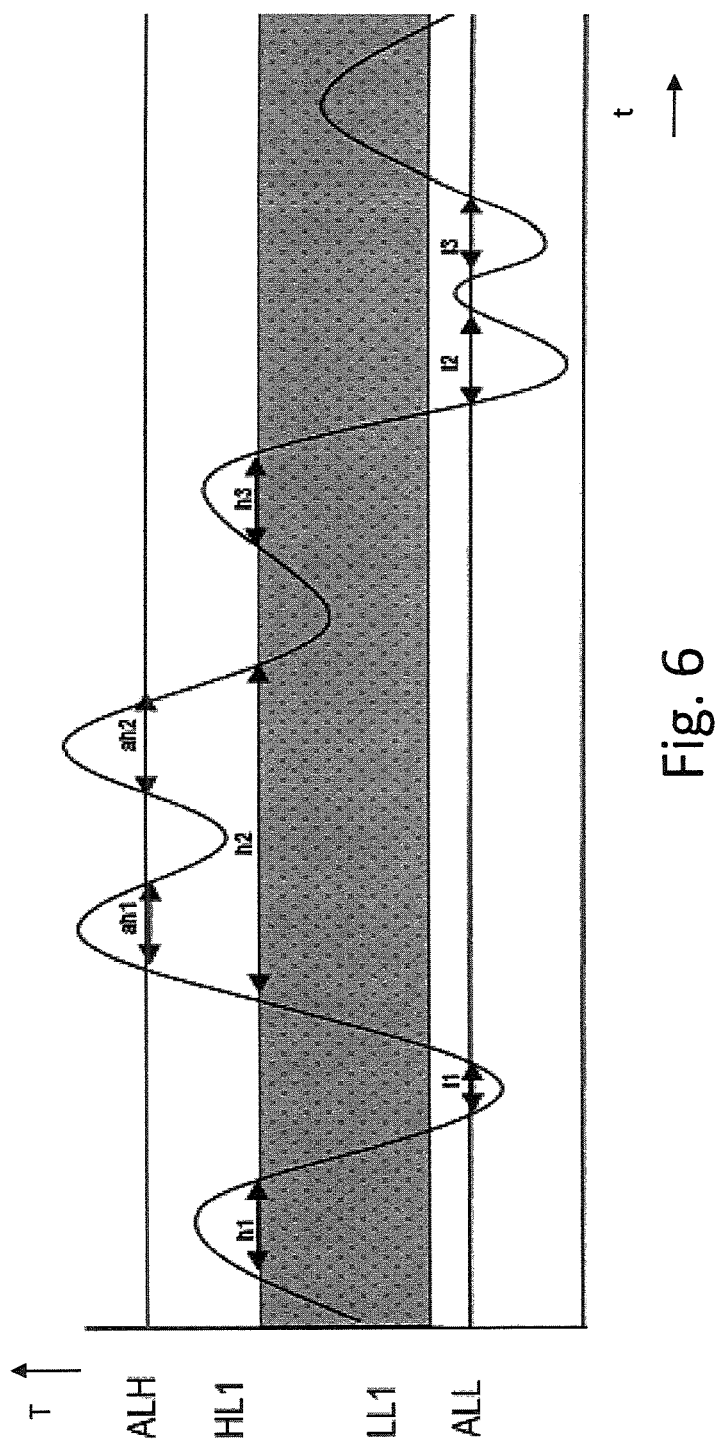
FIG. 6 shows an example of a time behaviour of the ambient temperature T whereby several range limits are crossed.

FIG. 6 shows an example of a temperature behaviour which may result in the activation of one or more alarm states. The periods that the temperature exceeds ALH are indicated by ah1 and ah2. The periods that the temperature is below LL1 are indicated by l1, l2, and l3. The periods that the temperature is above HL1 are indicated by h1, h2 and h3. In the situation shown in FIG. 6 t1=ah1+ah2. If t1>$t_{ALH}$ then alarm state AS1 is activated and stored in the device. t2=l1+l2+l3. If t2>$t_{ALL}$ then alarm state AS2 is activated and stored in the device. t3=h1+h2+h3. If t3>$t_{HL1}$ then alarm state AS3 is activated and stored in the device.

Figure 7:
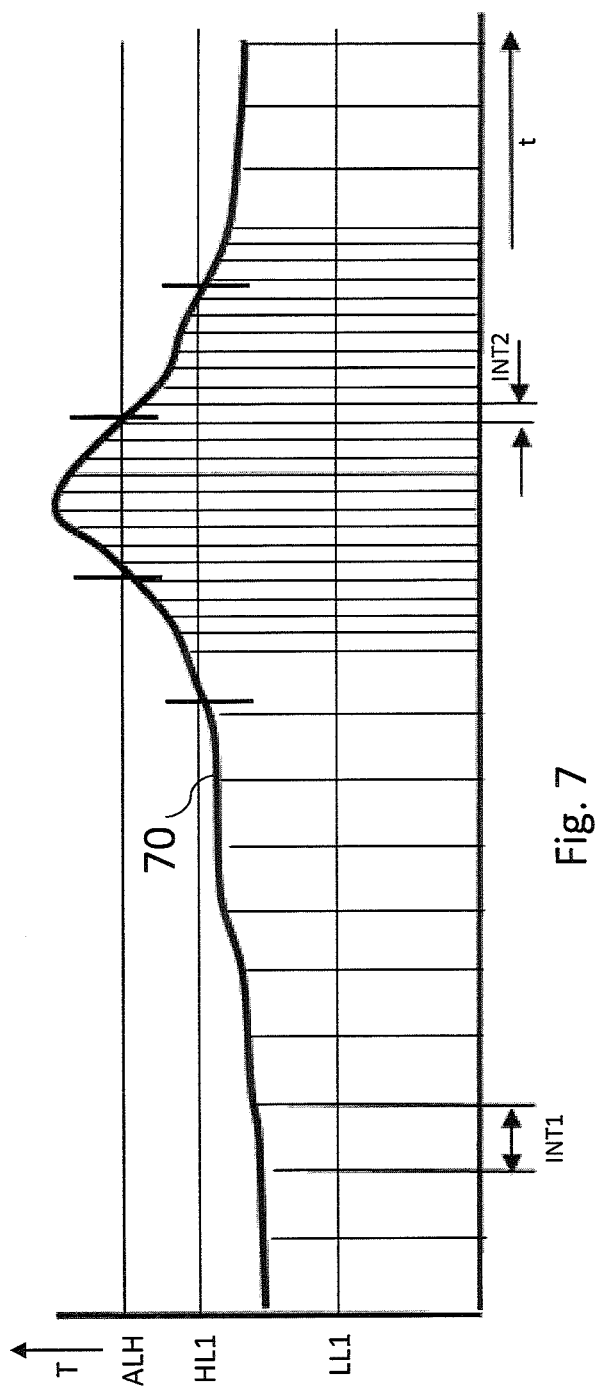
FIG. 7 shows the ambient temperature T as a function of time t, which is sampled with two different time intervals.

In an embodiment of the control program the change of the length of the sample interval from the normal length INT1 to a smaller length INT2 is triggered when the temperature level passes the temperature high level limit HL1 of the range R1, and when the temperature passes the low level limit LL1 of range R1. The change from a normal sample interval INT1 to a short sample interval INT2 results in an accurate logging of the temperature in situations where the negative effect of the environment temperature can be substantial and wherein it is important to have accurate data to determine the effect reliably. It will be clear for the skilled person that in each of the trigger situations a positive effect on the accuracy is achieved. Although desirable, it is not required to initiate a switch to a shorter sample interval for each of these situations. The length of the sample interval is reset to the normal length INT1 when a stable behaviour of the temperature T is detected again. FIG. 7 shows an example of a temperature behaviour, represented by curve 70, wherein the change to a smaller length INT2 is caused by an exceeding of the high level limit HL1 of range R1.

Figure 4:
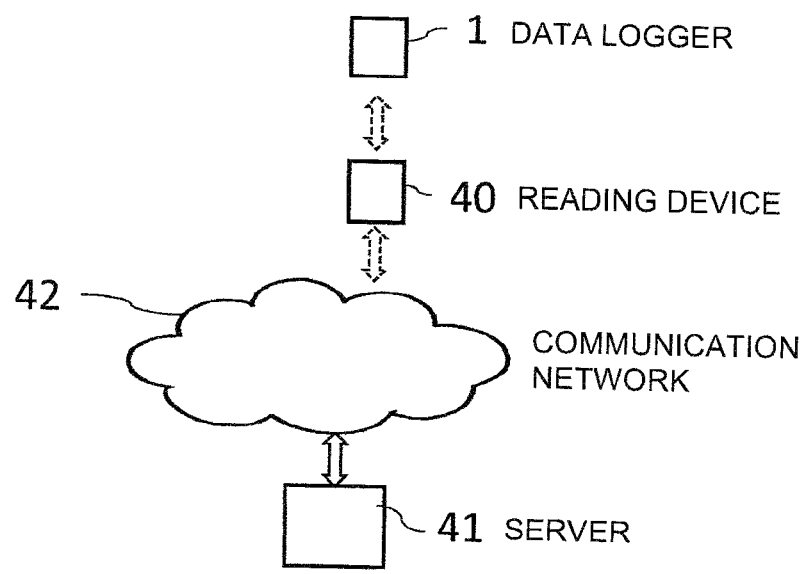
FIG. 4 shows a preferred context in which the data logger according to the invention is used.

FIG. 4 shows a preferred context in which the data logger according to the invention is used. This FIG. 4 shows a combination of a data logger 1 according to the invention in combination with a reading device 40 according the invention. The reading device 40 is of a type which is able to read the data records stored in the data logger 1. A very suitable reading device is a Smartphone with can read the record dates from the data logger. This can be via a wired connection between the reader device 40 and the data logger 1. However a wireless connection is preferred. As the wireless connection a connection using NFC-technology is preferred. An NFC enabled Smartphone with a suitable reading app can be used as a reading device for reading the data records from the data logger 1. A reading device according to the invention is provided with a decoder for reconverting the data records into the sample values of the sampled physical environment parameter. For that goal the reading device is arranged to convert data records in a sequence of M sample values having the representative value defined in the example by the bits b00-b10 of the data records. The number of the successive sample values is derived from the count stored in the bits b12-b15.

Preferably the decoder is implemented by means of a software controlled processor. In case of the use of a Smartphone for the reading device the Smartphone can be loaded with an app for reading and decoding the data records and displaying the logged temperature behaviour as a list, table or graph on the display of the Smartphone.

Preferably the app is made available for downloading on a server 41 which is connected to a communication network 42, such as for example the internet.

By downloading the app onto the Smartphone the Smartphone is transformed into a reading device which is able to make the logged data visible for the user in comfortable way.

The data logger is very suitable for monitoring the storage conditions of medication and food. Due to miniaturization of the electronic circuitry the sampling and encoding part of the data logger can be very small and consequently very cheap. Moreover by using the encoding method according to the invention very efficient use is made of the memory capacity, so that a memory of only a limited size is required for storing the sampled data over a very long period (e.g. several years). So overall the data logger can be produced with only a very small fraction of the costs of the medications monitored.

By using a Smartphone loaded with a dedicated app the temperature behaviour during the storage of the food or medication package can be made visible in a comfortable way with no hardware costs for the user.

So the invention offers a cheap, easy to use, high quality solution for monitoring the storage conditions of medications.

However it will be clear that application field of the invention is not limited to monitoring the storage conditions of medications. The invention is very beneficial for all applications for which there is a need to monitor the storage conditions of a product over a long period against limited costs.

Although several embodiments of the present invention have been illustrated in the accompanying drawings and described in the above detailed description, it will be understood that the invention is not limited to the embodiments disclosed, but is capable of numerous modifications without departing from the scope of the invention as set out in the following claims.

For example embodiments in which only samples are encoded which have values which are above or below a predetermined range fall within the framework of the invention, can be provided.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit can fulfil the functions of several items recited in the claims. The mere fact that certain measures are recited in mutually different dependent claims does not indicate that a combination of these measures cannot be used to advantage. Any reference symbol in the claims should not be construed as limiting the scope.

The invention claimed is:

1. A data logger for determining the quality of medications or foods in relation to a physical environment parameter, comprising:
   A) a measurement device for physically measuring a physical environment parameter of medications and food selected from one of the following parameters:
      ambient temperature
      humidity,
      light intensity and
      noise,
   B) a sampling subsystem for acquiring sample values of the physical environment parameter at sampling moments which are separated by sample intervals,
   C) an encoding subsystem for:
      defining data records representing groups of one of:
         one sample value with variations which meet a first stability criterion and
         a number of successive sample values with variations which meet the first stability criterion,
      including at least one flag bit in each data record indicating a length of the sample interval for the samples represented by the data record,
   C1) the encoding subsystem comprising a counter for counting successive samples whereby a count of the counter indicates a result of the counting,
   whereby each data record comprises first identifiable bits defining a representative value for the samples values of the corresponding group and second identifiable bits defining the number of samples in the corresponding group,
   D) a memory subsystem for storing a sequence of defined data records into a memory, wherein each data record corresponding to a plurality of sample values, includes only a single sample value for that data record as long as the plurality of sample values meet the first stability criterion, E) a processor for:
setting a length of the sample interval to one of:
a first length and
a second length which is smaller than the first length,
setting the sample interval to the second length in response to a detection of a passing of a predetermined level by the physical environment parameter, which is an indication that a more accurate logging of the environment parameter is desired,
determining the total time that the environment parameter exceeds a predetermined level and sets the sample interval to the second length in case said total time exceeds a preset maximum value,
resetting the time interval to the first length in response to a detection that a stability criterion is met which criterion indicates that the variation of the environment parameters stays within predetermined limits during a predetermined time interval,
resetting the counter in response to one of:
a first instability detection indicating that the first stability criterion is not met and
a detection that the count has reached an end value,
whereby the encoding subsystem is further arranged to define, in response to said first instability detection, a new data record with the second identifiable bits based on the count at a moment directly preceding the reset of the counter,
resetting the length of the sampling interval to the first length in response to a detection that the counter has reached the end value,
causing the memory subsystem to record only a single sample value for each data record of the plurality of sample values as long as the plurality of sample values meet the first stability criterion;

F) a data reading device for reading out the data records from the memory for determination of the quality of the medications and food, and G) an interface for transporting the data records stored in the memory to the data reading device.

2. A data logger as claimed in claim 1, wherein the memory is arranged to store a date and time that the monitor process is started.

3. A data logger as claimed in claim 2 wherein the memory for storing the date and time of the start of the sampling is a write-once memory.

4. A method for determining the quality of medications or foods in relation to a physical environment parameter, comprising the steps of:

A) physically measuring, with a measurement device, a physical environment parameter of medications and food selected from one of the following parameters:
ambient temperature
humidity,
light intensity and
noise, B) acquiring sample values of the physical environment parameter by a sampling subsystem at sampling moments which are separated by sample intervals, C) defining data records representing groups of one of:
one sample value with variations which meet a first stability criterion and
a number of successive sample values with variations which meet the first stability criterion, D) including at least one flag bit in each data record indicating a length of the sample interval for the samples represented by the data record, E) counting successive samples by a counter whereby a count of the counter indicates a result of the counting, F) providing that each data record comprises first identifiable bits defining a representative value for the samples values of the corresponding group and second identifiable bits defining the number of samples in the corresponding group, G) storing a sequence of defined data records into a memory, wherein each data record corresponding to a plurality of sample values, includes only a single sample value for that data record as long as the plurality of sample values meet the first stability criterion, H) determining environment parameters of the medications and food, said step of determining including the sub-steps of:
setting a length of the sample interval to one of:
a first length and
a second length which is smaller than the first length,
setting the sample interval to the second length in response to a detection of a passing of a predetermined level by the physical environment parameter, which is an indication that a more accurate logging of the environment parameter is desired,
determining the total time that the environment parameter exceeds a predetermined level and sets the sample interval to the second length in case said total time exceeds a preset maximum value,
resetting the time interval to the first length in response to a detection that a stability criterion is met which criterion indicates that the variation of the environment parameters stays within predetermined limits during a predetermined time interval,
resetting the counter in response to one of:
a first instability detection indicating that the first stability criterion is not met and
a detection that the count has reached an end value,
whereby the encoding subsystem is further arranged to define, in response to said first instability detection, a new data record with the second identifiable bits based on the count at a moment directly preceding the reset of the counter,
causing the memory to record only a single sample value for each data record of the plurality of sample values as long as the plurality of sample values meet the first stability criterion;
resetting the length of the sampling interval to the first length in response to a detection that the counter has reached the end value, and I) reading out the data records from the memory for determination of the quality of the medications and food.

5. A method as claimed in claim 4, further comprising the step of detecting and storing the date and time at which the monitor process is started.

* * * * *